US008054756B2

(12) United States Patent
Chand et al.

(10) Patent No.: US 8,054,756 B2
(45) Date of Patent: Nov. 8, 2011

(54) PATH DISCOVERY AND ANALYTICS FOR NETWORK DATA

(75) Inventors: Jagdish Chand, Santa Clara, CA (US); Suresh Antony, San Jose, CA (US); Rakesh Jain, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 947 days.

(21) Appl. No.: 11/523,371

(22) Filed: Sep. 18, 2006

(65) Prior Publication Data

US 2008/0069081 A1    Mar. 20, 2008

(51) Int. Cl.
 *H04L 12/26* (2006.01)
(52) U.S. Cl. ........ 370/252; 370/248; 709/224; 702/179; 702/187
(58) Field of Classification Search .......... 370/248, 370/252; 709/224; 702/179, 187; 705/1
See application file for complete search history.

(56) References Cited

U.S. PATENT DOCUMENTS

| 6,470,383 | B1 * | 10/2002 | Leshem et al. | 709/223 |
| 6,671,711 | B1 * | 12/2003 | Pirolli et al. | 709/200 |
| 6,804,701 | B2 * | 10/2004 | Muret et al. | 709/203 |
| 7,017,110 | B1 * | 3/2006 | Chi et al. | 715/205 |
| 7,533,179 | B2 * | 5/2009 | Tarquini et al. | 709/228 |
| 7,590,619 | B2 * | 9/2009 | Hurst-Hiller et al. | 1/1 |
| 2002/0067360 | A1 * | 6/2002 | Chi et al. | 345/441 |
| 2002/0130907 | A1 * | 9/2002 | Chi et al. | 345/853 |
| 2002/0143925 | A1 * | 10/2002 | Pricer et al. | 709/224 |
| 2004/0054784 | A1 * | 3/2004 | Busch et al. | 709/228 |
| 2004/0139192 | A1 * | 7/2004 | Spaid | 709/224 |
| 2008/0183664 | A1 * | 7/2008 | Cancel et al. | 707/2 |
| 2009/0037355 | A1 * | 2/2009 | Brave et al. | 706/45 |

OTHER PUBLICATIONS

HypKNOWsys, Web-Log Preparation with WUMprep, Oct. 18, 2005, Sourceforge.*
Kathuria, I, robot? Don't believe your web stats, Mar. 2006, Limitless Innovations.*
Haigh et al., "Measuring Web Site Usage: Log File Analysis", Information Technology Services, National Library of Canada, Aug. 4, 1998.

* cited by examiner

*Primary Examiner* — Aung S Moe
*Assistant Examiner* — Hoon J Chung
(74) *Attorney, Agent, or Firm* — Weaver Austin Villeneuve and Sampson LLP (57) ABSTRACT

A solution is provided that efficiently tracks user paths within a large network. Raw node visit data may be received that indicates which users visited which nodes in the network at which time. This data may then be organized into sessions. Unique pathviews may be calculated for each session of the nodes visit data as well as the frequency of occurrence of each unique path view. This information may then be used to understand how users are progressing through a network.

14 Claims, 7 Drawing Sheets

FIG. 1

User id1 \t 12:30:04 \t node1
User id1 \t 12:30:33 \t node2       200
User id1 \t 12:31:54 \t node1
User id1 \t 13:45:32 \t node2
User id1 \t 13:45:40 \t node3
User id1 \t 13:46:32 \t node5       202

User id2 \t 13:25:24 \t node1
User id2 \t 13:25:50 \t node2
User id2 \t 13:26:01 \t node3
User id2 \t 13:30:12 \t node2
User id2 \t 13:31:02 \t node4
User id2 \t 13:31:06 \t node5

FIG. 2

User id1 \t s1 \t node1
User id1 \t s1 \t node2
User id1 \t s1 \t node1
User id1 \t s2 \t node2
User id1 \t s2 \t node3
User id1 \t s2 \t node5

User id2 \t s1 \t node1
User id2 \t s1 \t node2
User id2 \t s1 \t node3
User id2 \t s1 \t node2
User id2 \t s1 \t node4
User id2 \t s1 \t node5

Node list

P=a
Q=a
R=a   402
S=b

Hierarchical
definitions file

P=1
Q=1    1=a   406
R=1    2=b
404    S=2    3=t
T=3

Node to integer
mappings

FIG. 4

Input:

user1   session1   node1
user1   session1   node2
user 2  session1   node1
user 2  session1   node1

500

Output:

User1   session1   node1-int
User1   session1   node2-int
User2   session1   node1-int

Input:

Session 1:  A    B    C    D    C    E       600
Session 2:  A    B    C    D
Session 3:  A    B    C Output:

PATH DISCOVERY AND ANALYTICS FOR NETWORK DATA

BACKGROUND OF THE INVENTION

1. Field of the Invention

The present invention relates to network usage data. More particularly, the present invention relates to path discovery and analytics for network data.

2. Description of the Related Art

The process of analyzing Internet-based actions such as web surfing patterns is known as web analytics. One part of web analytics is understanding how user traffic flows through a network (also known as user paths). This typically involves analyzing which nodes a user encounters when accessing a particular network. In large networks such as, for example, large search engine/directories, billions of pageviews may be generated per day. As such, analyzing this huge amount of data can be daunting. Such analysis is needed, however, to determine common user behavior in order to optimize the network for better user engagement and network integration.

What is needed is a solution that efficiently discovers all user paths across a large-scale network.

SUMMARY OF THE INVENTION

A solution is provided that efficiently tracks user paths within a large network. Raw node visit data may be received that indicates which users visited which nodes in the network at which time. This data may then be organized into sessions. Unique pathviews may be calculated for each session of the nodes visit data as well as the frequency of occurrence of each unique path view. This information may then be used to understand how users are progressing through a network.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

A solution is provided that efficiently tracks user paths within a large network. Raw node visit data may be received that indicates which users visited which nodes in the network at which time. This data may then be organized into sessions. Unique pathviews may be calculated for each session of the nodes visit data as well as the frequency of occurrence of each unique path view. This information may then be used to understand how users are progressing through a network.

Figure 1:
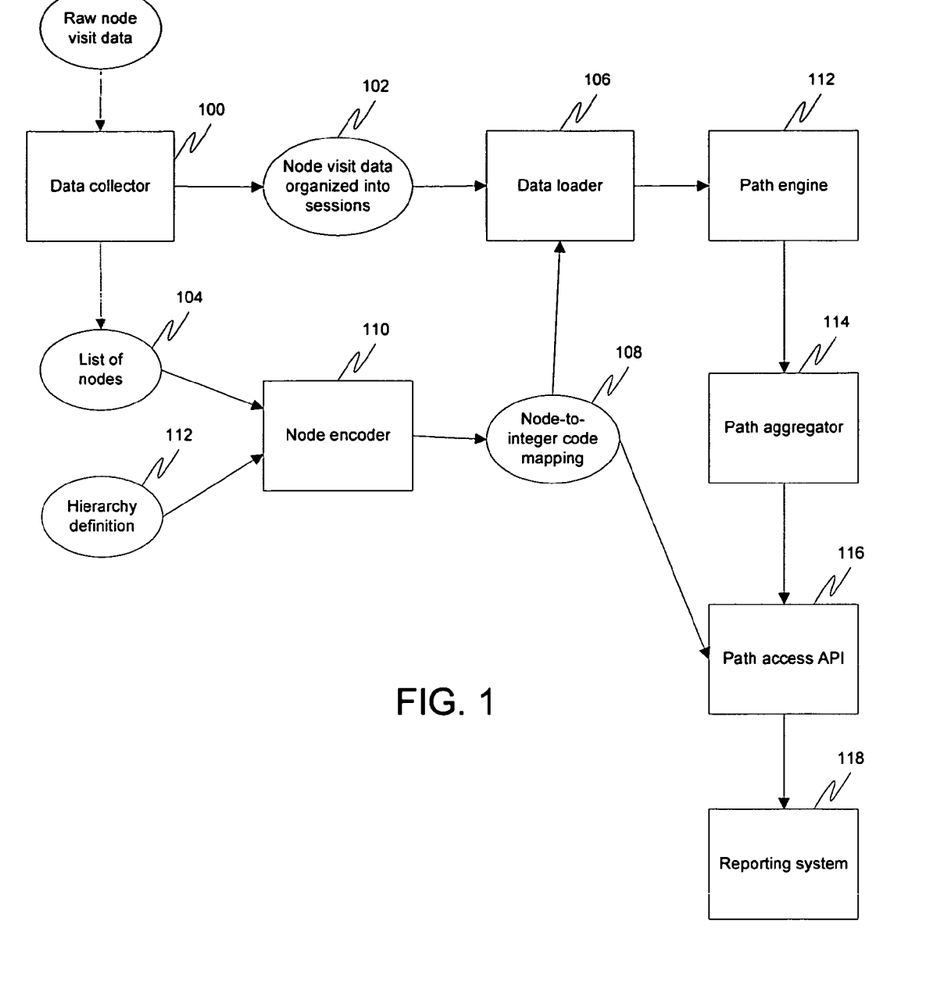
FIG. 1 is a block diagram illustrating a system for tracking user paths in accordance with an embodiment of the present invention.
Figure 2:
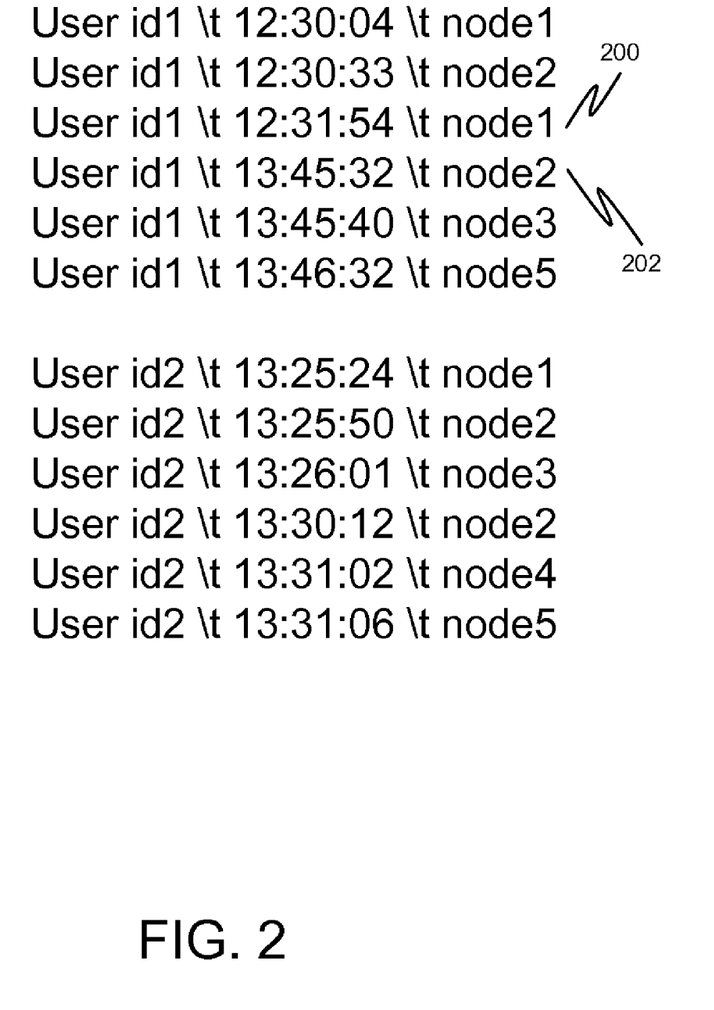
FIG. 2 is a diagram illustrating an example of raw input in accordance with an embodiment of the present invention.

FIG. 1 is a block diagram illustrating a system for tracking user paths in accordance with an embodiment of the present invention. A data collector 100 may receive raw input data regarding user paths and split node visits into different sessions, resulting in output data 102. The data collector 100 may also generate a list of nodes 104. In an embodiment of the present invention, the raw input may be in the form <user id> <timestamp> <node>. FIG. 2 is a diagram illustrating an example of raw input in accordance with an embodiment of the present invention. As can be seen, user id1 visited node 1 at 12:30:04, then node 2 at 12:30:33, then traveled back to node 1 at 12:31:54. He then visited node 2 again, but not until much later (13:45:32). As such, this later visit may be viewed by the system as a distinct session. The difference in timestamp between the two nodes may be used to determine if a visit represents a new session. A configurable threshold may be set, and if that threshold is exceeded, the visits represent different sessions. In one embodiment of the present invention, the threshold may be set at 30 minutes. In FIG. 2, user id1 waited one hour, 13 minutes, and 38 seconds between visit 200 and 202. As such, these may be viewed as distinct sessions.

Splitting node visits into different sessions allows the resulting data to be easily analyzed as to how many times a transition from a particular node to another node occurred. This information is useful in determining user patterns, for example, whether something on node 1 drew the user to node 2, or whether the user accessed node 2 on a whim.

Figure 3:
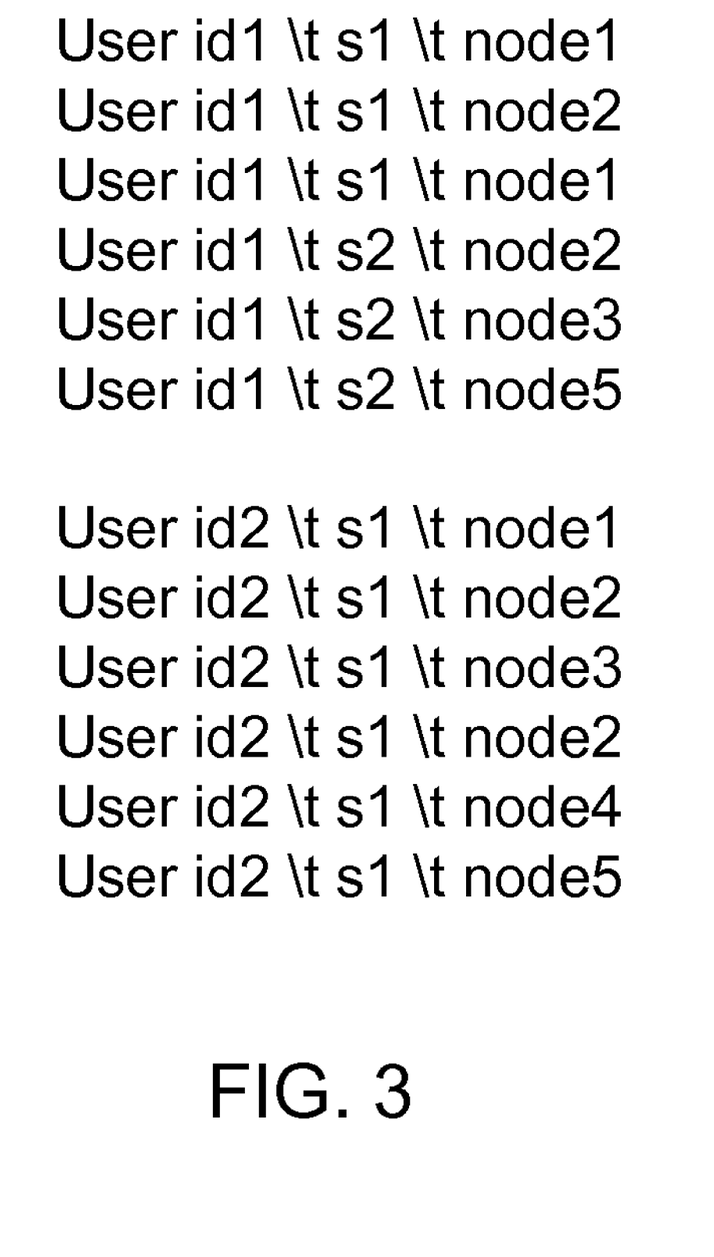
FIG. 3 is a diagram illustrating an example of output data in accordance with an embodiment of the present invention.

The data collector may convert the raw data into data that is grouped by session ids. FIG. 3 is a diagram illustrating an example of output data in accordance with an embodiment of the present invention. As can be seen, the timestamps in the raw data have been replaced by session identifiers.

Figure 4:
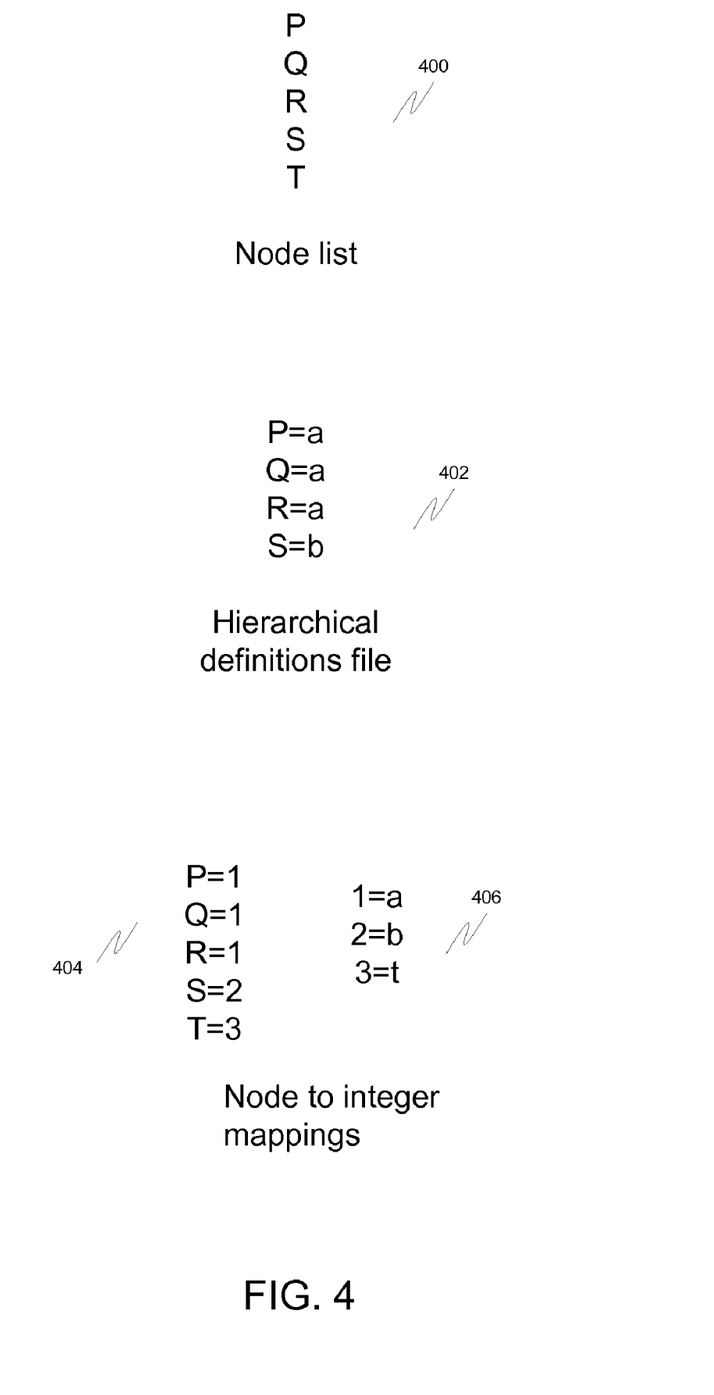
FIG. 4 is a diagram illustrating an example of input to and output from a node encoder in accordance with an embodiment of the present invention.

Referring back to FIG. 1, the output data 102 may then be accessed by the data loader 106, along with a node-to-integer code mapping 108 generated by a node encoder 110. Node encoder 110 may take as input the list of nodes 104 and an optional hierarchy definition file 112. The hierarchy definition file may specify groups of nodes that belong to particular sets. The node encoder 110 takes all the nodes and encodes them into unique integer values. Groupings of nodes that belong to a particular set as defined in the hierarchy definition file 112 may be encoded with the same value. The node encoder 110 may output two files: (1) an encode file, which contains the mapping from node to encoded integer value; and (2) a decode file, which has a mapping from encoded integer value to node. FIG. 4 is a diagram illustrating an example of input to and output from a node encoder in accordance with an embodiment of the present invention. 400 may represent a sample node list, while 402 may represent an optional hierarchical definitions file. 404 may represent an encode file and 406 may represent a decode file.

Figure 5:
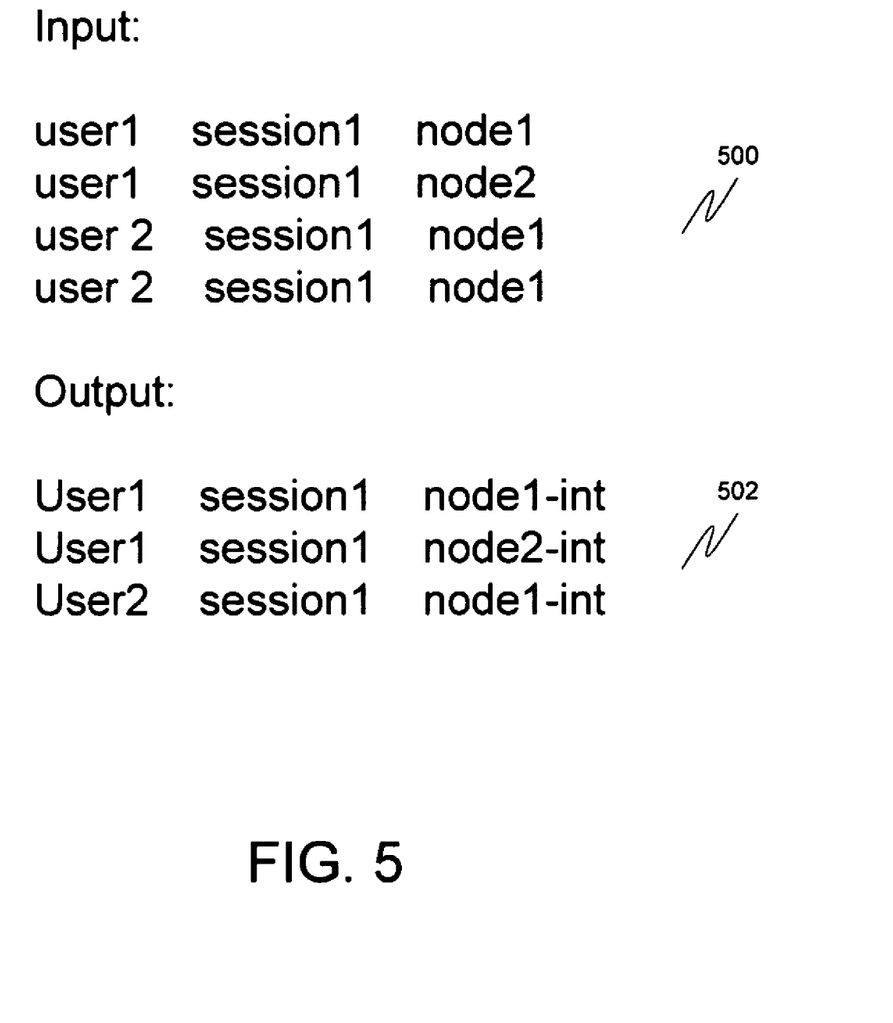
FIG. 5 is a diagram illustrating an example of input to and output from the data loader 106 in accordance with an embodiment of the present invention.

Referring back to FIG. 1, a data loader 106 may take as input the "session-ized" data 102 produced by the data collector 100 and the encode file 108 generated by the node encoder 110. It may then convert nodes on the data 102 into encoded integer values. It may then also convert occurrences of the same adjacent nodes into a single occurrence. Lastly, it may also flag robotic activity. If the user has viewed more pages than a certain threshold in a certain session, that session may be flagged as a robotic session. A robotic session is one that was likely performed by a computer program instead of a user. This allows the data to be filtered and the robotic activity removed, should the data analyst so desire. FIG. 5 is a diagram illustrating an example of input to and output from the data loader 106 in accordance with an embodiment of the present invention. Here, the "session-ized" input data 500 may be converted into output 502.

Referring back to FIG. 1, the output generated by data loader 106 may be input to a path engine 112. The path engine 112 may take all the nodes belonging to a particular session and calculate all the unique pathviews that happened in that session. It may repeat this procedure for each session. The path engine 112 may also track the frequency of each path view. After all of the sessions are processed, it may output all the path views and their frequencies. For example, suppose a user visited the following nodes in a single session in the given order:

| 2. | A | B | C | D | C | E |
|---|---|---|---|---|---|---|

Thus, the user visited node D and then went back to node C, wherefrom he visited node E. The path views for this session may be:

| 2. | A | B | C | D | and |
|---|---|---|---|---|---|
| 3. | A | B | C | E | |

Figure 6:
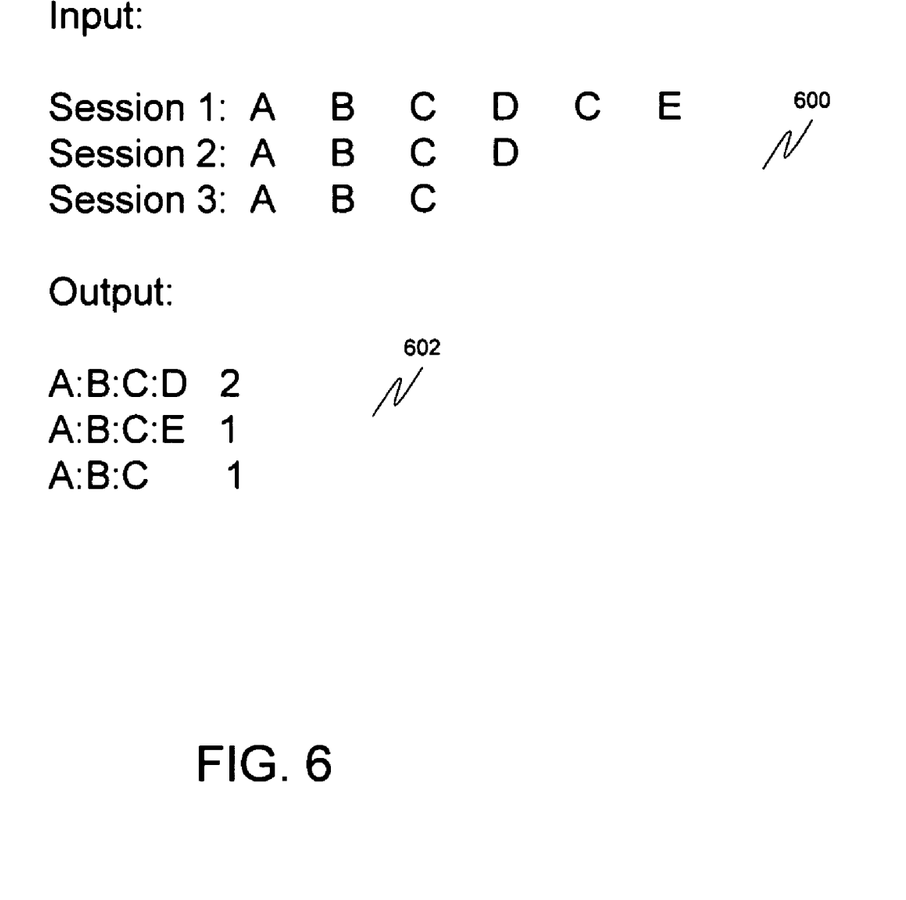
FIG. 6 is a diagram illustrating an example of input to and output from a path engine in accordance with an embodiment of the present invention.

These two path views indicate the unique paths the user took. FIG. 6 is a diagram illustrating an example of input to and output from a path engine in accordance with an embodiment of the present invention. Here, three sessions may have been undertaken, indicated at 600, and the resulting path views and their respective frequencies are indicated at 602.

Referring back to FIG. 1, the output generated by the path engine 112 may be input to a path aggregator 114. For scalability purposes, the input data may be split into multiple files (buckets). This module may aggregate the output produced by the path engine into one single file. If the same path views happened in different files (buckets), this module may also add up the frequencies of those path views. This module may also format its output into a particular format so that it can be easily accessed for different types of queries. For that, it may encode a unique integer at the end of every unique path view. It may then produce a file, sorted by node, with the format <node> <path id> <location of node in this path> <frequency of path>. It may also produce a file of the same format but sorted by path id. These files may be split into multiple buckets using a predestinated criteria. This makes access very fast when looking for a particular node. A path access Application Program Interface (API) 116 may then be used to query the data. It may utilize the output of the path aggregator 114, as well as the decode file 108 generated by the node encoder 110. It is able to obtain information such as, for example, the top (i.e., most frequently used) paths between the start and end node, the top paths for a given start node, and the top paths containing a given node. A reporting system 118 may create reports based on the queries.

Figure 7:
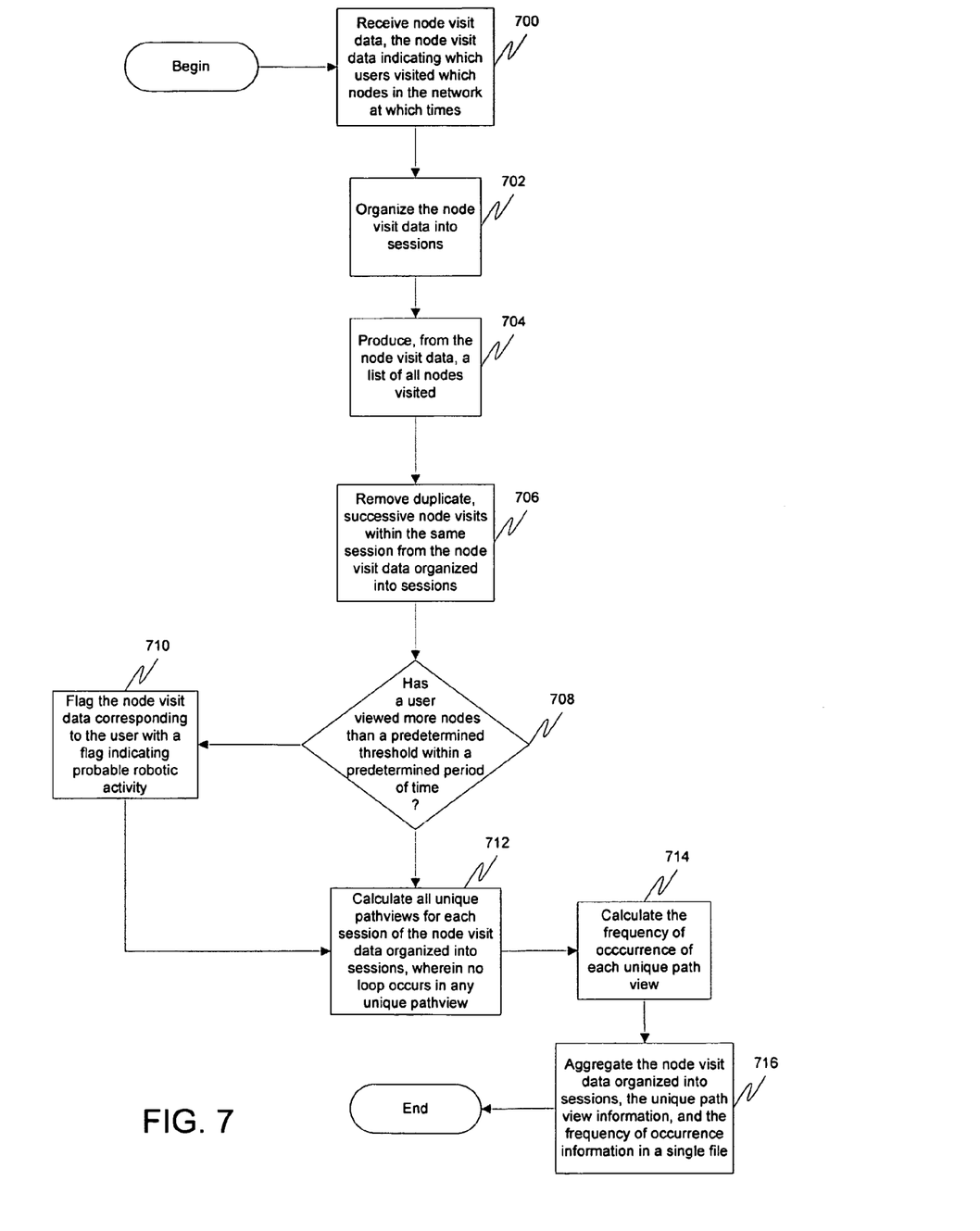
FIG. 7 is a flow diagram illustrating a method for path discovery of network usage data in accordance with an embodiment of the present invention.

FIG. 7 is a flow diagram illustrating a method for path discovery of network usage data in accordance with an embodiment of the present invention. At 700, node visit data may be received. The node visit data may indicate which users visited which nodes in the network at which times. At 702, the node visit data may be organized into sessions. This may be accomplished by comparing timestamps of node visits by the same user to determine if the node visits occurred during the same session. If, for example, the difference in time between timestamps of two subsequent node visits by the same user is less than a predetermined session threshold (e.g., 30 minutes), then the two node visits may be grouped into the same session. At 704 a list of all nodes visited may be produced from the node visit data. This may include assigning each node, or each set of nodes, a unique identifier. Sets of nodes may be identified in a hierarchy file.

At 706, duplicate, successive node visits within the same session may be removed from the node visit data organized into sessions. At 708, it may be determined, from the node visit data, if the user has viewed more nodes than a predetermined threshold within a predetermined period of time. If so, then the node visit data corresponding to the user may be flagged with a flag indicating probable robotic activity.

At 710, all unique pathviews for each session of the node visit data organized into sessions may be calculated, wherein no loop occurs in any unique pathview. At 712, the frequency of occurrence of each unique path view may be calculated. At 714, the node visit data organized into sessions, the unique path view information, and the frequency of occurrence information may be organized into a single file.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method performed by a processor for path discovery of network usage data, the method comprising:
   at one or more computing devices configured to perform path discovery, receiving node visit data, wherein the node visit data indicates which users visited which nodes in a network at which times; organizing, using the one or more computing devices, the node visit data into sessions;
   producing, from the node visit data a list of all nodes visited;
   creating a node-to-integer code mapping and an integer-to-node code mapping using the list of all nodes visited and a hierarchy definition, using the one or more computing devices;
   converting nodes in the organized node visit data into corresponding integers using the node-to-integer code mapping;

removing duplicate, successive node visits within the same session from the converted, organized node visit data, using the one or more computing devices;

calculating, using the one or more computing devices, all unique pathviews for each session of the converted, organized node visit data, wherein no loop occurs in any unique pathview, wherein a pathview represents a sequence of two or more nodes in the order in which a user visited the two or more nodes in a single session, and a pathview is unique if it is not identical to, or a subset of, another pathview of the single session;

calculating a frequency of occurrence of each unique pathview;

receiving a query from a path access application program interface; and sending data about the unique pathviews and the frequencies of occurrence responsive to the query to the path access program interface, using the one or more computing devices, wherein the path access application program interface is capable of decoding the unique pathviews using the integer-to-node mapping.

2. The method of claim 1, wherein said organizing includes comparing timestamps of node visits by the same user to determine if the node visits occurred during the same session.

3. The method of claim 2, wherein two node visits by the same user are grouped into the same session if the difference in time between the timestamps is less than a predetermined session threshold.

4. The method of claim 3, wherein the predetermined session threshold is 30 minutes.

5. The method of claim 1, wherein said producing includes assigning each node a unique identifier.

6. The method of claim 1, wherein said producing includes assigning each set of nodes a unique identifier, wherein sets of nodes are identified in a hierarchy file.

7. The method of claim 1, further comprising:
determining, from the node visit data organized into sessions, if a user has viewed more nodes than a predetermined threshold within a predetermined period of time; and
flagging the node visit data corresponding to the user with a flag indicating probable robotic activity.

8. The method of claim 1, wherein the hierarchy definition specifies groups of nodes that belong to particular sets.

9. An apparatus for path discovery in a network, the apparatus comprising:

a data collector configured to receive node visit data, wherein the node visit data indicates which users visited which nodes in the network at which times, organize the node visit data into sessions, and produce, from the node visit data, a list of all nodes visited;

a node encoder configured to create a node-to-integer code mapping and an integer-to-node code mapping using the list of all nodes visited and a hierarchy definition;

a data loader coupled to the data collector and to the node encoder and configured to convert nodes in the organized node visit data into corresponding integers using the node-to-integer code mapping, and remove duplicate, successive node visits within the same session from the converted, organized node visit data;

a path engine coupled to the data loader and configured to calculate all unique pathviews for each session of the converted, organized node visit data, wherein no loop occurs in any unique pathview, wherein a pathview represents a sequence of two or more nodes in the order in which a user has visited the two or more nodes in a single session, and a pathview is unique if it is not identical to, or a subset of, another pathview of the single session, and calculate a frequency of occurrence of each unique pathview; and a path aggregator coupled to the path engine.

10. The apparatus of claim 9, further comprising a path access application program interface coupled to the path aggregator.

11. The apparatus of claim 10, further comprising a reporting system coupled to the path access application program interface.

12. The apparatus of claim 9, wherein the node encoder is configured to assign each node or set of nodes in the list of all nodes visited a unique identifier.

13. The apparatus of claim 9, wherein the data loader is further configured to:
determine, from the node visit data organized into sessions, if a user has viewed more nodes than a predetermined threshold within a predetermined period of time; and
flag the node visit data corresponding to the user with a flag indicating probable robotic activity.

14. The apparatus of claim 9, wherein the hierarchy definition specifies groups of nodes that belong to particular sets.

* * * * *